(12) United States Patent
Kato et al.

(10) Patent No.: US 7,336,866 B2
(45) Date of Patent: Feb. 26, 2008

(54) OPTICAL FIBER DEVICE

(75) Inventors: Yoshichika Kato, Tokyo (JP); Ryoji Kaku, Shibuya-ku (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 28 days.

(21) Appl. No.: 11/499,611

(22) Filed: Aug. 3, 2006

(65) Prior Publication Data
US 2007/0036485 A1    Feb. 15, 2007

(30) Foreign Application Priority Data
Aug. 15, 2005   (JP)   ............... 2005-235262

(51) Int. Cl.
*G02B 6/26*   (2006.01)
(52) U.S. Cl. ............................. 385/17; 385/18
(58) Field of Classification Search ................. 385/16, 385/17, 18, 34, 96, 124
See application file for complete search history.

(56) References Cited

U.S. PATENT DOCUMENTS

| | | | |
|---|---|---|---|
| 6,315,462 B1 | 11/2001 | Anthamatten et al. | |
| 6,815,865 B2 | 11/2004 | Marxer | |
| 7,039,268 B2 * | 5/2006 | Yoshida et al. | ............... 385/18 |
| 2003/0026539 A1 * | 2/2003 | Kato | ........................... 385/34 |

FOREIGN PATENT DOCUMENTS

| JP | 56-039507 | 4/1981 |
|---|---|---|
| JP | 2003-043270 | 2/2003 |
| JP | 2005-037885 | 2/2005 |

\* cited by examiner

*Primary Examiner*—Quyen P Leung
(74) *Attorney, Agent, or Firm*—Gallagher & Lathrop; David N. Lathrop, Esq.

(57) ABSTRACT

There is provided an optical fiber device including two optical fibers, rod lenses, and an optical functional element. The two rod lenses have the same refractive index distribution and the front face of each is respectively formed, at the approximate midpoint of a position where the mode field diameter of the propagating light emitted from the optical fiber and propagating through the interior of the rod lens forms a local maximum, and a position where the mode field diameter, in case the same rod lens is assumed to be extended in the axial direction, forms a local minimum subsequent to the aforementioned local maximum, in the propagation direction of the same propagating light, perpendicularly to the axis. Also, both front faces of the two rod lenses are arranged symmetrically with respect to a point where a beam waist is formed.

10 Claims, 4 Drawing Sheets

OPTICAL FIBER DEVICE

BACKGROUND OF THE INVENTION

1. Field of the Invention

This invention pertains to an optical fiber device having two optical fibers whose tips are arranged facing each other and are optically coupled, and an optical functional element interposed between the same tips.

2. Description of the Related Art

A wide variety of optical fiber devices consisting in interposing an optical functional element effecting an action corresponding to an objective with respect to propagating light, e.g. a moving mirror, a moving shutter or the like, or a fixed optical filter or the like, in an optical path constituted between the tips of optical fibers whose tips are arranged facing each other, are proposed and put into practical use.

In optical fiber devices like these, reflected return light which is reflected at the end faces and so forth of the optical fibers and is incident again into the optical fibers is a cause of noise. Therefore, in optical fiber devices like these, the reduction of such reflected return light has become an important task.

E.g., in U.S. Pat. No. 6,315,462 (Patent Reference 1), there is described an optical fiber device in which a moving mirror is arranged between the tips of optical fibers in which the tips are arranged facing each other and designed to carry out switching of the optical path by inserting and removing a moving mirror with respect to the optical path. In this Patent Reference 1, there is described forming a reflection prevention film on the optical fiber end faces which should reduce reflected return light at the optical fiber end faces and, further, dipping the optical fiber end faces and the mirror in a refractive index matching agent (matching oil) to eliminate the refractive index difference at the interface.

Also, e.g. in Japanese Patent Application Laid Open No. 2005-37885 (Patent Reference 2), there is described, similarly to Patent Reference 1, performing oblique polishing of the optical fiber end faces which should reduce reflected return light, in an optical fiber device carrying out switching of the optical path by means of a moving mirror.

Further, e.g. in Japanese Patent Application Laid Open No. 1981-39507 (Patent Reference 3), there is described, in an optical fiber connector connecting optical fibers, reducing the end face reflected light, without performing oblique polishing of the optical fiber end faces, by mounting rod lenses respectively to the end faces of the connected optical fibers and adjusting the pitch of the same rod lenses.

Moreover, in optical fiber devices wherein an optical functional element is arranged between the optical fiber tips, by providing a lens on the optical fiber tips, there is brought a degree of freedom in carrying out operations like reducing the spot size of the light radiated on the optical functional element and changing the working distance from the optical fiber tips to the optical functional elements. E.g., in Japanese Patent Application Laid Open No. 2003-43270 (Patent Reference 4), there is described a configuration designed to be able to independently modify both the aforementioned light spot size and working distance by connecting a spacer with a uniform refractive index to the optical fiber end faces and connecting a graded index optical fiber to the other end face of the same spacer.

As mentioned above, as a method for reducing the reflected return light at the optical fiber end faces, there have been the methods of carrying out operations like forming a reflection prevention film on the optical fiber end faces and dipping the optical fiber end faces in a refractive index matching agent (e.g. Patent Reference 1). These are methods of reducing the reflected light itself, but there are limits to the performance of reflection reduction. E.g., even if a reflection prevention film (non-reflective multi-layer film) with a performance which is the highest at today's technical level is used, the reflection attenuation thereof has an upper limit on the order of 45 dB. Moreover, the reflection attenuation in the case of using the method of dipping the optical fiber end faces in a refractive index matching agent is also of the same order.

As against this, the configuration of carrying out oblique polishing of the optical fiber end faces (e.g. Patent Reference 2) is one which suppresses the incidence again of reflected light on the optical fiber, the reflection coupling loss thereof attaining 60 dB. This value is a sufficient value for optical fiber devices. However, for the manufacturing of optical fiber devices with this structure, the manufacturing process called oblique polishing is necessary, so the cost associated with the same polishing step becomes necessary. In addition to this, with this structure, since the light is emitted obliquely from the obliquely polished optical fiber end faces, the design and fiber inspection work of the coupling system corresponding thereto becomes complex and difficult, and also, there is the disadvantage of several constraints arising from the fact that the light is emitted obliquely. In addition, this structure also has the drawback that the efficiency of the transmitted light is inferior compared to the aforementioned method of reducing the reflected light itself.

Moreover, in the structure described in Patent Reference 3, the reflected light is reduced by using a rod lens adjusted to the required pitch, in substitution for the oblique polishing of the optical fiber end faces. However, what is described in Patent Reference 3 is an optical fiber connector, so this structure cannot be applied to an optical fiber device having a structure in which there is provided a gap between optical fiber tips and an optical functional element is interposed in the concerned gap.

Further, as an optical fiber capable of sufficiently reducing the reflected return light, without oblique polishing of the optical fiber end faces, there is the spherically tipped optical fiber in which the core itself of the terminal portion of the optical fiber has been shaped into a spherical surface. However, a spherically tipped optical fiber has a working distance which is exceedingly short and a beam waist diameter of the emitted light which is exceedingly small, so there is the drawback that the freedom in the design of an optical system is small because of these points. In addition, it is not straightforward to form, with accurate control, the three-dimensional shape of such a core. Because of that point, the cost of spherically tipped optical fibers is high.

Moreover, notwithstanding the fact that there is described in Patent Reference 4 an optical fiber terminal structure for which a high degree of freedom can be obtained regarding the light spot size and working distance, there is not in any way a description regarding reducing reflected return light in this Patent Reference 4.

SUMMARY OF THE INVENTION

The object of this invention is to provide an optical fiber device which, without using oblique polishing of the end faces, is able to sufficiently reduce the reflected return light and accordingly to have excellent performance, and is capable of being configured at low cost.

In the present invention, there is provided an optical fiber device including: two optical fibers whose tips are arranged facing each other and are optically coupled, rod lenses provided one each at each tip portion of the two optical fibers, and an optical functional element interposed between each front face of the two rod lenses. Here, the front face of each of the two rod lenses is respectively formed perpendicularly to the axis of the rod lens thereof, at the approximate midpoint of a position where the mode field diameter of the propagating light, emitted from the optical fiber at which the same rod lens is provided and propagating through the interior of the rod lens, forms a local maximum, and a position where the mode field diameter, in case the same rod lens is assumed to be extended in the axial direction, forms a local minimum subsequent to the aforementioned local maximum, in the propagation direction of the same propagating light.

Also, both front faces of the two rod lenses are arranged symmetrically with respect to the point at which the transmitted light, emitted from one front face to the exterior, forms a beam waist.

Preferably, in the present invention, there is formed a non-reflective film on the front face of at least one of the two rod lenses.

Preferably, in the present invention, each front face of the two rod lenses, and the optical functional element, are dipped in a refractive index matching agent.

Preferably, in the present invention, the two rod lenses consist of graded-index optical fibers.

Preferably, in the present invention, the rod lenses have the same diameter as the optical fibers.

Preferably, in the present invention, the rod lenses are connected to the optical fiber tips via spacers having a light transmitting property. Preferably here, the refractive index is uniform. Also, preferably, the spacers have the same diameter as the optical fibers.

Preferably, in the present invention, the two optical fibers are single-mode optical fibers.

DETAILED DESCRIPTION OF THE PREFERRED EMBODIMENT

Below, an explanation will be given regarding a preferred embodiment of this invention.

As mentioned above, the optical fiber device of this invention includes: two optical fibers whose tips are arranged facing each other and which are optically coupled, rod lenses provided one each at each tip portion of the two optical fibers, and an optical functional element interposed between each front face of the two rod lenses. Here, the optical fibers may be single-mode optical fibers or multi-mode optical fibers, and further, they may be step index optical fibers, multi step index optical fibers, or graded index optical fibers. However, below, for the purposes of simplifying the explanation, the explanation will be given for an example using, as the optical fiber, a single-mode optical fiber having a step index structure.

Figure 1:
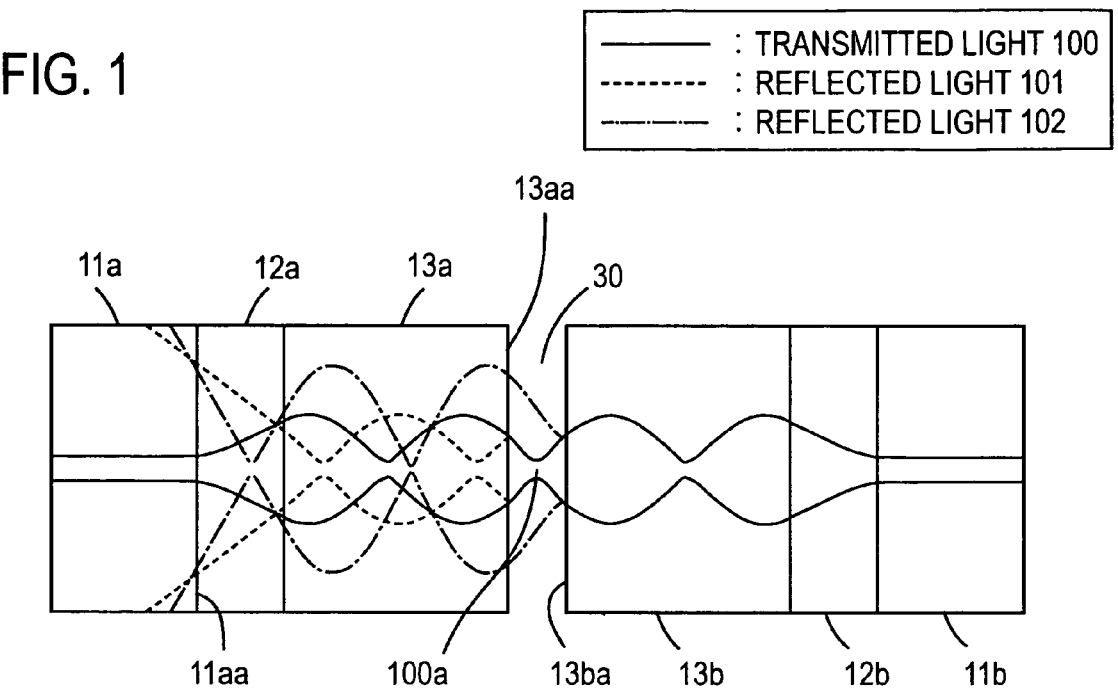
FIG. 1 is a diagram schematically showing the terminal structure, arrangement relation and the light loci, of two single-mode optical fibers in one embodiment of this invention.

FIG. 1 is a diagram schematically showing the terminal structure, the arrangement relation, and the light loci of two single-mode optical fibers in an embodiment of this invention.

As shown in FIG. 1, at the tip portions of two single-mode optical fibers 11a, 11b, rod lenses 13a, 13b are respectively connected via spacers 12a, 12b, and the front faces of the same rod lenses 13a, 13b are arranged facing each other. In the case of this example, spacers 12a, 12b consist of optical fibers having the same diameter as single-mode optical fibers 11a, 11b and a uniform refractive index, and rod lenses 13a, 13b consist of graded index optical fibers having the same diameter as single-mode optical fibers 11a, 11b. Also, in the case of this example, the two rod lenses 13a, 13b arranged facing each other have the same length in the axial direction, and have the same refractive index distribution (the refractive index distribution in the cross-sectional direction perpendicular to the axis).

This kind of single-mode optical fiber 11a, 11b terminal structure is manufactured by respectively connecting by fusing spacers 12a, 12b and rod lenses 13a, 13b to the tips of single-mode optical fibers 11a, 11b.

Specifically, e.g. by the processes (1) to (4) shown below, it is possible to manufacture the concerned terminal structure.

(1) The optical fiber for spacer 12a and the graded index optical fiber for rod lens 13a are respectively connected by fusing. In the same way, the optical fiber for spacer 12b and the graded index optical fiber for rod lens 13b are respectively connected by fusing.

(2) The optical fibers for spacers 12a, 12b are cut to a prescribed length, by using e.g. a stress cutter, to constitute spacers 12a, 12b.

(3) Single-mode optical fibers 11a, 11b are respectively connected by fusing to the cut faces of spacers 12a, 12b.

(4) The graded index optical fibers for rod lenses 13a, 13b are cut to a prescribed length, by using e.g. a stress cutter, to constitute rod lenses 13a, 13b. In this way, the terminal structure of single-mode optical fibers 11a, 11b, such as shown in FIG. 1, is completed.

In this structure, such as shown in this FIG. 1, the light having propagated through one single-mode optical fiber 11a propagates through spacer 12a and rod lens 13a and is emitted from a front face 13aa (emission end face) of rod lens 13a. The emitted light is incident on a front face 13ba of the other, facing rod lens 13b, propagates through rod lens 13b and spacer 12b, and reaches the other single-mode optical fiber 11b. In FIG. 1, the solid line shows the loci of the light propagating in this way (transmitted light 100) and the dashed line shows the loci of reflected light 101 reflected at front face 13aa of rod lens 13a.

The mode field diameter of transmitted light 100 propagating through the interior of rod lens 13a changes periodically in response to the position in the propagation direction thereof (the center axis direction of rod lens 13a), as shown in FIG. 1.

In the case of this example, front face 13aa of rod lens 13a is formed perpendicularly to the axis of rod lens 13a, at the midpoint of a position where the mode field diameter of transmitted light 100, emitted from single-mode optical fiber 11a and propagating through the interior of rod lens 13a, forms a local maximum, and a position where the mode field diameter, in case the same rod lens 13a is assumed to be extended in the axial direction, forms a local minimum subsequent to the aforementioned local maximum, in the propagation direction of the same transmitted light 100. In the same way, front face 13ba of rod lens 13b is formed perpendicularly to the axis of rod lens 13b, at the midpoint of a position where the mode field diameter of the transmitted light emitted from single-mode optical fiber 11b and propagating through the interior of rod lens 13b, forms a local maximum, and a position where the mode field diameter, in case the same rod lens 13b is assumed to be extended in the axial direction, forms a local minimum subsequent to the aforementioned local maximum, in the propagation direction of the same transmitted light.

If front face 13aa of rod lens 13a is provided at a "midpoint" position like this, the mode field diameter, as shown in FIG. 1, is maximized at the position where the reflected light 101 reflected at the same front face 13aa is reradiated on end face 11aa of single-mode optical fiber 11a. In this case, the recoupling efficiency of reflected light 101 toward single-mode optical fiber 11a is minimized.

Figure 2:
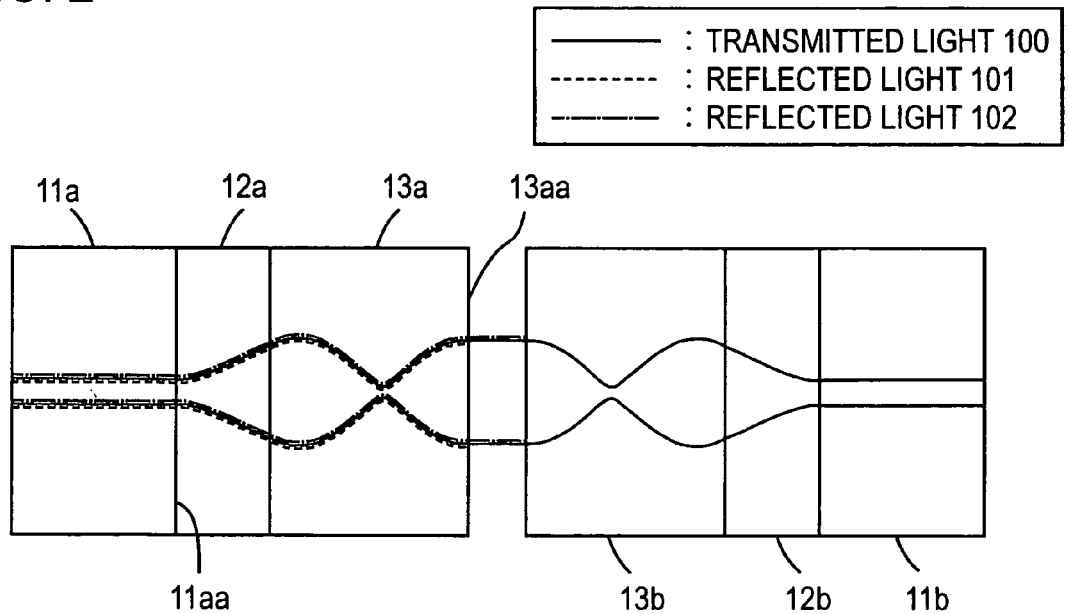
FIG. 2 is a diagram showing a comparative example with respect to FIG. 1.

FIG. 2 is a diagram showing a comparative example with respect to FIG. 1. In the configuration of FIG. 2, the length of rod lens 13a is specified, i.e. the position of front face 13aa of rod lens 13a is specified, so that transmitted light 100 emitted from front face 13aa of rod lens 13a becomes parallel light. In this case, reflected light 101 at front face 13aa ends up being almost completely incident again on single-mode optical fiber 11a. As a result, the recoupling efficiency of reflected light 101 toward single-mode optical fiber 11a ends up being maximized.

Figure 3:
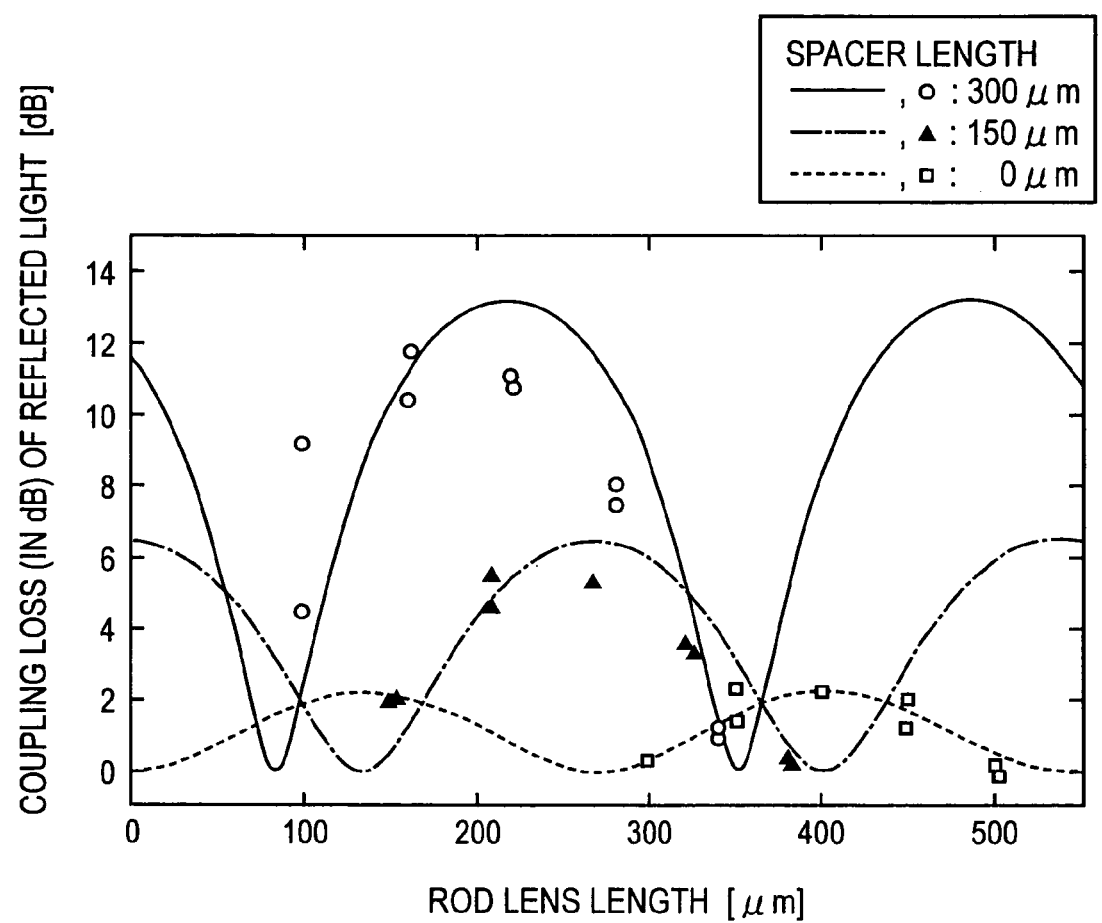
FIG. 3 is a graph showing the relationship between the length of the rod lens and the coupling loss of the reflected light.

FIG. 3 is a graph showing simulation results (expressed with a solid line, a dash and dot line, and a dashed line) and experimental results (expressed with circles, triangles, and squares) for the recoupling efficiency of reflected light 101 toward single-mode optical fiber 11a versus the length of rod lens 13a. Here, the abscissa axis indicates the length of rod lens 13a (in μm) in the axial direction and the ordinate axis indicates the coupling loss (in dB) of the recoupling efficiency of reflected light 101. Moreover, FIG. 3 shows data for the case where the length of spacer 12a is 300 μm (expressed with a solid line and circles), the case of 150 μm (expressed with a dash and dot line and triangles), and the case of 0 μm (the case of no spacer 12a: the case where rod lens 13a is directly connected by fusing to single-mode optical fiber 11a; expressed with a dashed line and squares).

The point of local maximum of the simulation curve in FIG. 3 corresponds to the case where front face 13aa of rod lens 13a is positioned at the aforementioned "midpoint". That is to say that, in the case where front face 13aa of rod lens 13a is positioned at the aforementioned "midpoint", the coupling loss of reflected light 101 has a local maximum, so this position of front face 13aa becomes the optimal point for reducing the reflected return light. Further, from this FIG. 3, it follows that by increasing the length of spacer 12a, a greater coupling loss can be obtained.

Incidentally, in the embodiment of this invention, due to demands with respect to e.g. other performance/characteristics like light spot size and working distance and so forth, there may arise cases where it is not possible to position front face 13aa of rod lens 13a at the optimal point of coupling loss of reflected light 101. Taking into account cases like these and so forth, it is acceptable not to position front face 13aa of rod lens 13a rigorously at the aforementioned "midpoint", it being considered acceptable to position the front face at an "approximate midpoint" (i.e. a point in the vicinity of the midpoint and within the range in which the operating effect of reducing the reflected return light can be sufficiently obtained).

Specifically, in the case of the present embodiment, a non-reflective multi-layer film (reflection prevention film) is formed on front face 13aa of rod lens 13a, although an illustration thereof is omitted in FIG. 1. Front face 13aa of rod lens 13a is positioned at the aforementioned "midpoint" or "approximate midpoint" and further, by forming this non-reflective multi-layer film on front face 13aa, the structure becomes one aimed at reducing the reflected return light. Below, an explanation regarding this point will be given.

The performance of reflection attenuation based on a non-reflective multi-layer film has a limit on the order of 45 dB, as mentioned above. Moreover, for optical fiber devices with high performance and high accuracy, a coupling loss of reflected light on the order of 50 dB is demanded. Consequently, by positioning front face 13aa of rod lens 13a at the aforementioned "midpoint" or "approximate midpoint", if a reflected light 101 coupling loss equal to or greater than 5 dB can be obtained, it is possible, by using this in combination with a non-reflective multi-layer film, to obtain the reflection coupling loss of 50 dB required for an optical fiber device. And then, the specification of a front face 13aa position like this may be carried out by selecting the length of rod lens 13a from the region, e.g. in the simulation curve shown in FIG. 3, in which the value of the reflected light 101 coupling loss is equal to or greater than 5 dB.

Next, an explanation will be given regarding the arrangement relation of the two facing rod lenses 13a, 13b.

As shown in FIG. 1, transmitted light 100 emitted from rod lens 13a propagates through a space 30 with no boundary conditions while reducing the mode field diameter. This transmitted light 100 forms a beam waist 100a at a certain distance from front face 13aa of rod lens 13a and thereafter again propagates while expanding the mode field diameter. In this way, transmitted light 100 becomes a light beam with point symmetry in the center of beam waist 100a. Also, an optical functional element is normally placed in the position of beam waist 100a, and the distance from rod lens 13a to beam waist 100a becomes the working distance.

Here, front faces 13aa, 13ba of rod lenses 13a, 13b are taken to be respectively in the "midpoint" as described above, i.e. the optimal point. Further, front faces 13aa, 13ba of both rod lenses 13a, 13b are taken to be arranged with point symmetry with respect to the point at which the transmitted light 100, emitted from front face 13aa of one rod lens 13a to the exterior, forms a beam waist 100a.

In this case, not only is the reflected return light, resulting from the fact that transmitted light 100 emitted from single-mode optical fiber 11a is reflected at front face 13aa of the same rod lens 13a, reduced, but the reflected return light, resulting from the fact that transmitted light 100 emitted from front face 13aa of rod lens 13a is reflected at front face 13ba of rod lens 13b on the coupling companion side, is also reduced. Specifically, when reflected light 102 arising at front face 13ba of rod lens 13b on the coupling companion side is reradiated on end face 111aa of single-mode optical fiber 11a on the emission side, the same mode field diameter is sufficiently expanded, so the recoupling efficiency of the same reflected light 102 is reduced sufficiently. In FIG. 1, the dash and dot line indicates in this way the loci of reflected light 102 reflected at front face 13ba (incidence end face) of rod lens 13b on the incidence side. Further, it is acceptable for front faces 13aa, 13ba of both rod lenses 13a, 13b not to be arranged rigorously at the aforementioned "midpoint", it being acceptable to arrange the same at the aforementioned "approximate midpoint" as described above. Further, in the case of a structure like this, transmitted light 100 emitted from rod lens 13a and incident on rod lens 13b is incident on single-mode optical fiber 11b with good efficiency.

Above, in the structure shown in FIG. 1, an explanation has been given regarding the reduction effect of the reflected return light. In the preferred embodiment of this invention, a reflection attenuation performance on the order of 45 dB due to a non-reflective multi-layer film and a reflection coupling loss equal to or greater than several dB above 10 dB (e.g. in the case of a length of 300 μm of the spacer in FIG. 3) due to the optimization of the positions of front faces 13aa, 13ba of rod lenses 13a, 13b are added, so the reflection coupling loss in the end reaches the 60 dB level. This reflection coupling loss is one which bears comparison with the reflected return light reduction performance which can be obtained by means of a structure in which the end face of an optical fiber is shaped in three dimensions (e.g. a structure in which the optical fiber end face is polished obliquely or a structure shaped to be spherically tipped). Specifically, with the preferred embodiment of this invention, it is possible to implement a reflected return light reduction performance using an optical fiber with a perpendicular end face which can bear comparison with a structure in which the end face of the optical fiber is shaped in three dimensions.

Next, an explanation will be given regarding a specific configuration example of an optical fiber device.

Figure 4:
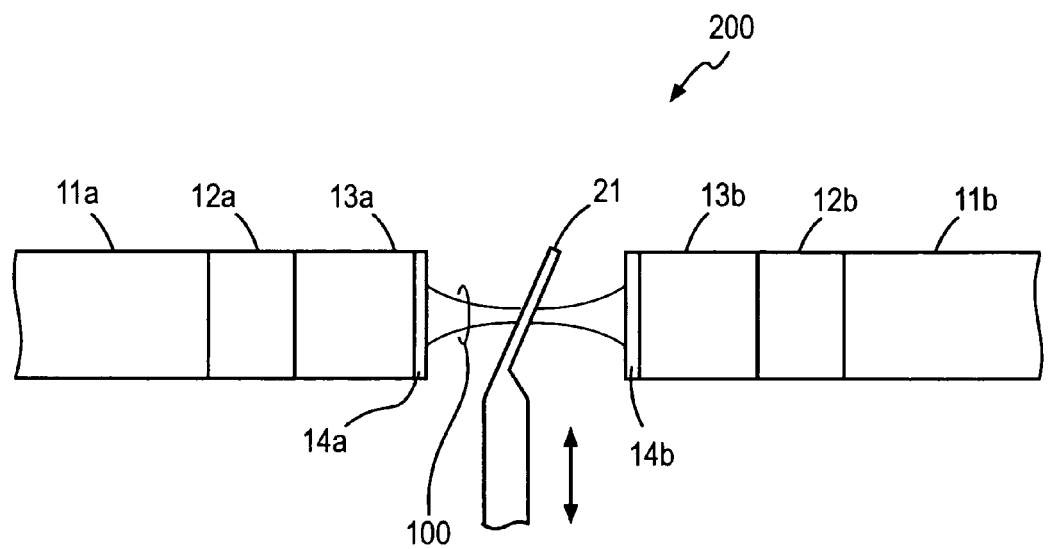
FIG. 4 is a diagram schematically illustrating an example of an optical fiber device having a moving mirror as an optical functional element.

FIG. 4 is a diagram schematically illustrating an example of an optical fiber device 200 having a moving mirror 21 as an optical functional element.

An optical fiber device 200 in FIG. 4 is provided with single-mode optical fibers 11a, 11b, spacers 12a, 12b, rod lenses 13a, 13b, non-reflective multi-layer films 14a, 14b, and a moving mirror 21 which is an optical functional element. One end each of spacers 12a, 12b is respectively connected to one end of each single-mode optical fiber 11a, 11b. Also, one end of rod lenses 13a, 13b is respectively connected to the other end of each spacer 12a, 12b. Further, non-reflective multi-layer films 14a, 14b are each formed respectively on the other end of each rod lens 13a, 13b.

Here, the lengths of spacers 12a, 12b and rod lenses 13a, 13b satisfy the condition (the condition of positioning the front faces of rod lenses 13a, 13b at the aforementioned "midpoint" or "approximate midpoint") explained using FIG. 1. Also, spacers 12a, 12b, rod lenses 13a, 13b, and non-reflective multi-layer films 14a, 14b have their respective central axes arranged on the same straight line, and at the same time, non-reflective multi-layer film 14a and non-reflective multi-layer film 14b are arranged to be positioned facing each other at a prescribed distance. Moreover, moving mirror 21 carries out operations like blocking transmitted light 100 and not blocking the transmitted light, depending on the position thereof, and when blocking transmitted light 100, the face of the same mirror is arranged at a transmitted light 100 beam waist position between non-reflective multi-layer film 14a and non-reflective multi-layer film 14b. Here, moving mirror 21 is inserted in the optical path of transmitted light 100, and on the occasion of blocking transmitted light 100, the mirror face of moving mirror 21 is configured obliquely so that the reflected light due to the concerned moving mirror 21 does not return to optical fiber 11a. The term "oblique" here means that the angle formed by the central axis of rod lenses 13a, 13b and the mirror face of moving mirror 21 is not in the neighborhood of 90°.

Figure 5:
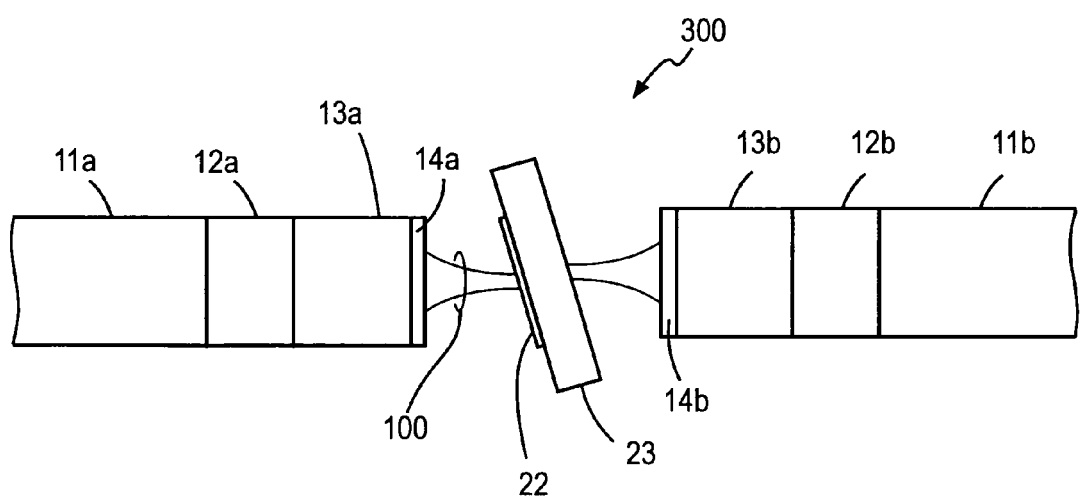
FIG. 5 is a conceptual diagram schematically showing an example of an optical fiber device having an optical filter as an optical functional element.

FIG. 5 is a conceptual diagram showing an example of an optical fiber device 300 of this invention, having an optical filter as an optical functional element. Further, an explanation will hereinafter be carried out centered on the points of difference between this optical fiber device 300 and optical fiber device 200 of FIG. 4.

Optical fiber device 300 in FIG. 5 is provided, in substitution for the aforementioned moving mirror 21, with an optical filter 22 which is an optical multi-layer film deposited on a substrate 23. Further, substrate 23 is constituted by a component (e.g. glass or the like) having transparency. This optical filter 22 is arranged at a transmitted light 100 beam waist position between non-reflective multi-layer film 14a and non-reflective multi-layer film 14b. Also, substrate 23 on which optical filter 22 is formed is fixed obliquely with respect to the central axis of rod lens 13a so that the reflected light at optical filter 22 does not return to optical fiber 11a. Further, the term "oblique" here means that the angle formed by the central axis of rod lens 13a and substrate 23 is not in the neighborhood of 90°.

Further, if substrate 23 on which optical filter 22 is formed in this way is fixed obliquely with respect to the optical axis, transmitted light 100 is polarized and has its axis shifted when transmitted through optical filter 22 and substrate 23. Because of that, in optical fiber device 300, the central axis of rod lens 13a and the central axis of rod lens 13b are not arranged on a straight line. The central axis of rod lens 13b is arranged on the central axis of transmitted light 100 the axis of which is shifted by optical filter 22 and substrate 23. And then, as shown in FIG. 5, the front faces of the two rod lenses 13a, 13b are arranged at positions with a point symmetry centered on the beam waist formed while being deviated inside substrate 23.

Figure 6:
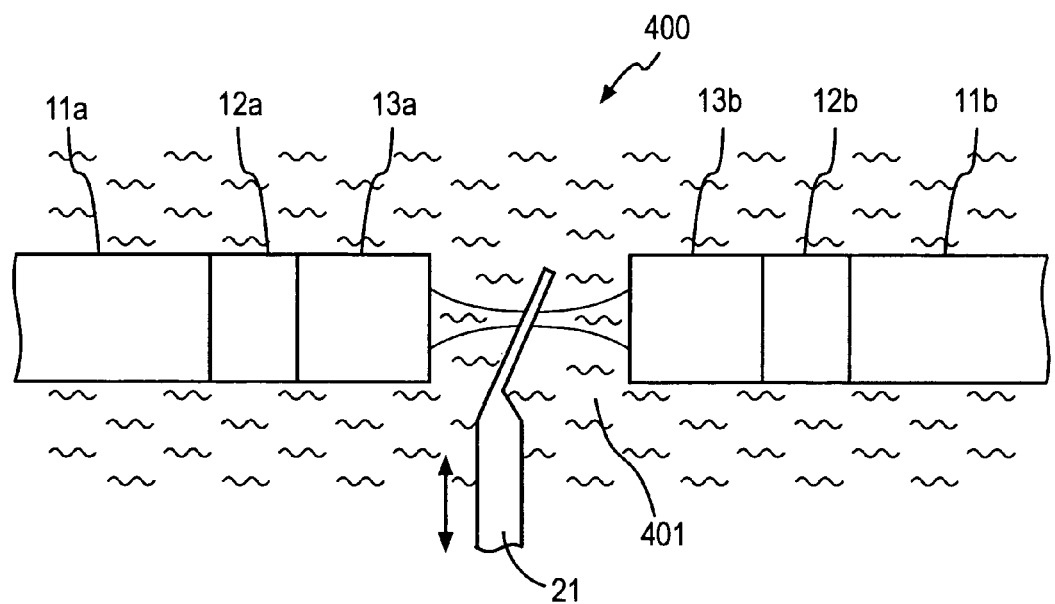
FIG. 6 is a diagram schematically showing an example of an optical fiber device in which the front faces of the rod lenses and a moving mirror being the optical functional element are dipped in a refractive index matching agent.
Figure 7:
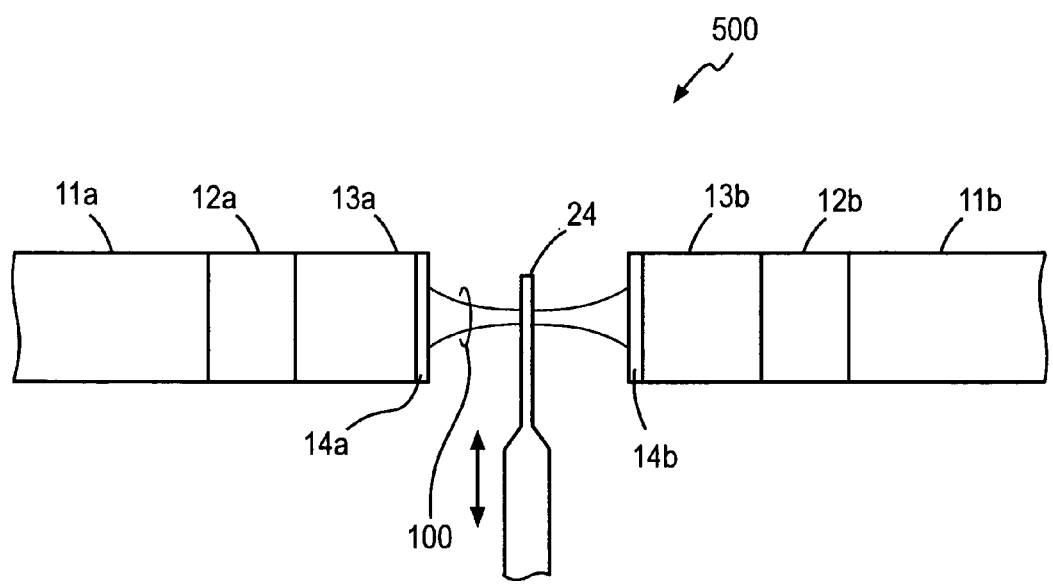
FIG. 7 is a conceptual diagram schematically showing an example of an optical fiber device having a moving shutter as an optical functional element.

Further, the optical functional element arranged in the optical fiber device of the present invention is not limited to this moving mirror and this optical filter. E.g., in substitution for a moving mirror functioning as an optical switch, it is possible, as the optical fiber device 500 illustrated by example in FIG. 7, to arrange a moving shutter 24 having the property of absorbing light or to similarly constitute an optical switch or an optical attenuator. Also, in the case of using a moving mirror 21 such as shown in FIG. 4 and FIG. 6 as the optical functional element, it is acceptable to further install a third optical port, for receiving the light reflected at moving mirror 21 inserted in the optical path, consisting of exactly the same structure as the optical fiber with a rod lens consisting of elements 11b to 13b (14b) and to choose an optical switch of the type switching the port at which the light is coupled.

In the optical fiber devices explained above, spacers 12a, 12b are respectively provided between single-mode optical fibers 11a, 11b and rod lenses 13a, 13b, but spacers 12a, 12b do not necessarily have to be provided. A configuration in which single-mode optical fibers 11a, 11b and rod lenses 13a, 13b are respectively connected directly is acceptable.

However, by providing this kind of spacers 12a, 12b, it is possible to obtain a high degree of freedom regarding the light spot size and the working distance, so it is possible to obtain an even larger coupling loss of the reflected light.

Moreover, non-reflective multi-layer films 14a, 14b are formed for the purpose of reducing reflection at the front faces of rod lenses 13a, 13b, but instead of this, a configuration is acceptable in which the front faces of rod lenses 13a, 13b and the optical functional element are dipped into a refractive index matching agent. Even as a result of this, it is possible to obtain reflection attenuation performance in the same range as for a non-reflective multi-layer film, as mentioned above. And then, by using in combination a structure such as this and a structure in which the front faces of rod lenses 13a, 13b are arranged at the aforementioned "midpoint" or "approximate midpoint", it is possible to obtain the reflection coupling loss of 50 dB required for an optical fiber device.

FIG. 6 is a diagram schematically showing an example of an optical fiber device 400 in which the front faces of the rod lenses 13a, 13b and an optical functional element are dipped in this way in a refractive index matching agent. Optical fiber device 400 is provided with single-mode optical fibers 11a, 11b, spacers 12a, 12b, rod lenses 13a, 13b, and a moving mirror 21 being an optical functional element, similar to those of optical fiber device 200 of FIG. 4. However, optical fiber device 400 is not provided with non-reflective multi-layer films 14a, 14b, the front faces of rod lenses 13a, 13b and the moving mirror 21 instead being dipped in a refractive index matching agent 401.

Further, as mentioned above, in the present embodiment, the refractive index distribution and the length in the axial direction, of the two rod lenses 13a, 13b constituting the optical fiber device, are taken to be the same. This is for the purpose of matching the mode field diameter of transmitted light 100 at each end face of the two single-mode optical fibers 11a, 11b to the mode field diameter of each single-mode optical fiber 11a, 11b. From this perspective, the axial direction lengths of the two rod lenses 13a, 13b may not necessarily be the same, since it is acceptable to have an integral multiple part difference of the "distance between local maxima of the mode field diameter". Further, the term "distance between local maxima of the mode field diameter" refers to the distance between the position on the central axis at which the mode field diameter of transmitted light 100 propagating through the interior of rod lens 13a becomes a local maximum and the position on the central axis at which the mode field diameter in the propagation direction of the same transmitted light 100 becomes, in case the same rod lens 13a is assumed to be extended in the axial direction, a local maximum subsequent to the aforementioned local maximum. Note, however, that in practice, it is preferable for the lengths of the two rod lenses 13a, 13b to be the same. This is because a structure in which the lengths of the two rod lenses 13a, 13b are the same has merits from the viewpoint of manufacturing.

Also, in the present embodiment, explanations have been given for a structure in which a non-reflective multi-layer film is deposited on both front faces of rod lenses 13a, 13b and a structure in which, without non-reflective multi-layer films being deposited on these, both front faces of rod lenses 13a, 13b are dipped in a refractive index matching agent. However, structures in which there is performed neither a deposition of a non-reflective multi-layer film on the front faces of rod lenses 13a, 13b nor a dipping of the front faces of rod lenses 13a, 13b in a refractive index matching agent are acceptable. In addition, a structure in which a non-reflective multi-layer film is deposited on only one of either rod lens 13a or 13b is acceptable. Further, a structure in which there is performed both a deposition of a non-reflective multi-layer film on the front faces of rod lenses 13a, 13b (on either one or both) and dipping of both front faces of rod lenses 13a, 13b in a refractive index matching agent is acceptable.

Moreover, in the present embodiment, graded index optical fibers having the same diameter as single-mode optical fibers 11a, 11b were utilized as rod lenses 13a, 13b. However, the present invention is not limited hereto. Specifically, an object having light transparency, consisting of a columnar external form, and having a structure in which the refractive index decreases continuously from the central axis thereof toward a cross-sectional direction can be utilized as rod lenses 13a, 13b of the present embodiment.

Also, spacers 12a, 12b of the present embodiment were optical fibers having the same diameter as single-mode optical fibers 11a, 11b and a uniform refractive index. However, the refractive index of the spacers may not necessarily be uniform. E.g., step index optical fibers consisting of a core having sufficiently large diameter and a cladding having a refractive index different from that of the concerned core may be used as spacers. The diameter of the core in this case is acceptable if, along with its having a sufficient size with respect to the mode field diameter of the concerned transmission light at the position where the transmission light is radiated on the end faces of rod lenses 13a, 13b, reflected light reradiating on the end faces of single-mode optical fibers 11a, 11b is not introduced by reflection at the interface of the cladding and not recoupled to the reverse transmission mode of the single-mode optical fiber 11a, 11b core.

Also, as in the present embodiment, in case the diameter of spacers 12a, 12b and rod lenses 13a, 13b is chosen to be the same as that of single-mode optical fibers 11a, 11b, the effect can be obtained that the positioning of single-mode optical fibers 11a, 11b, spacers 12a, 12b, and rod lenses 13a, 13b during manufacturing becomes easy.

However, a stricture in which the diameter of spacers 12a, 12b and rod lenses 13a, 13b is not the same as that of single-mode optical fibers 11a, 11b, is acceptable. The only thing is that, even if it is this case, the diameter of spacers 12a, 12b is acceptable if, along with its having a sufficient size with respect to the mode field diameter of the concerned transmission light at the position where the transmission light radiates on the end faces of rod lenses 13a, 13b, the reflected light reradiating on the end faces of single-mode optical fibers 11a, 11b is not guided and not recoupled to the reverse transmission mode of the single-mode optical fiber 11a, 11b core.

Moreover, in the present embodiment, single-mode optical fibers 11a, 11b have been taken to be used as the optical fibers. However, as mentioned above, graded index optical fibers or multi-mode optical fibers may be used as the optical fibers. The only thing is that, regardless of whether the optical fiber is single-mode or multi-mode and regardless of the presence of spacers, it is necessary for the diameter of the region of the rod lens having collecting capability to have sufficient size with respect to the mode field diameter of the transmitted light radiating from the same optical fiber to the rod lens. This is because a sufficient lens effect cannot be obtained if the mode field diameter is greater than the region of the rod lens having collecting capability.

What is claimed is:

1. An optical fiber device including:

two optical fibers the tips of which are arranged facing each other and are optically coupled, rod lenses provided one each at each tip portion of said two optical fibers, and an optical functional element interposed between each front face of said two rod lenses;

wherein said two rod lenses have the same refractive index distribution;

each front face of said two rod lenses is respectively formed, at the approximate midpoint of a position where the mode field diameter of the propagating light emitted from said optical fiber at which the same rod lens is provided and propagating through the interior of the rod lens forms a local maximum, and a position where the mode field diameter, in case the same rod lens is assumed to be extended in the axial direction, forms a local minimum subsequent to said local maximum, in the propagation direction of the same propagating light, perpendicularly to said axis; and both front faces of said two rod lenses are arranged symmetrically with respect to a point at which the transmitted light, emitted from one front face to the exterior, forms a beam waist.

2. The optical fiber device according to claim 1, wherein a non-reflective multi-layer film is formed on at least one front face of said two rod lenses.

3. The optical fiber device according to claim 1, wherein each front face of said two rod lenses and said optical functional element are dipped in a refractive index matching agent.

4. The optical fiber device according to claim 1, wherein said two rod lenses consist of graded index optical fibers.

5. The optical fiber device according to claim 1, wherein the diameter of said rod lenses is the same as that of said optical fibers.

6. The optical fiber device according to claim 1, wherein said rod lenses are connected to the tips of said optical fibers via spacers having a light transparent property.

7. The optical fiber device according to claim 6, wherein the refractive index of said spacers is uniform.

8. The optical fiber device according to claim 6, wherein the diameter of said spacers is the same as that of said optical fibers.

9. The optical fiber device according to claim 8, wherein the diameter of said rod lenses is the same as that of said optical fibers.

10. The optical fiber device according to claim 1, wherein said two optical fibers are single-mode optical fibers.

* * * * *